Figure 1:
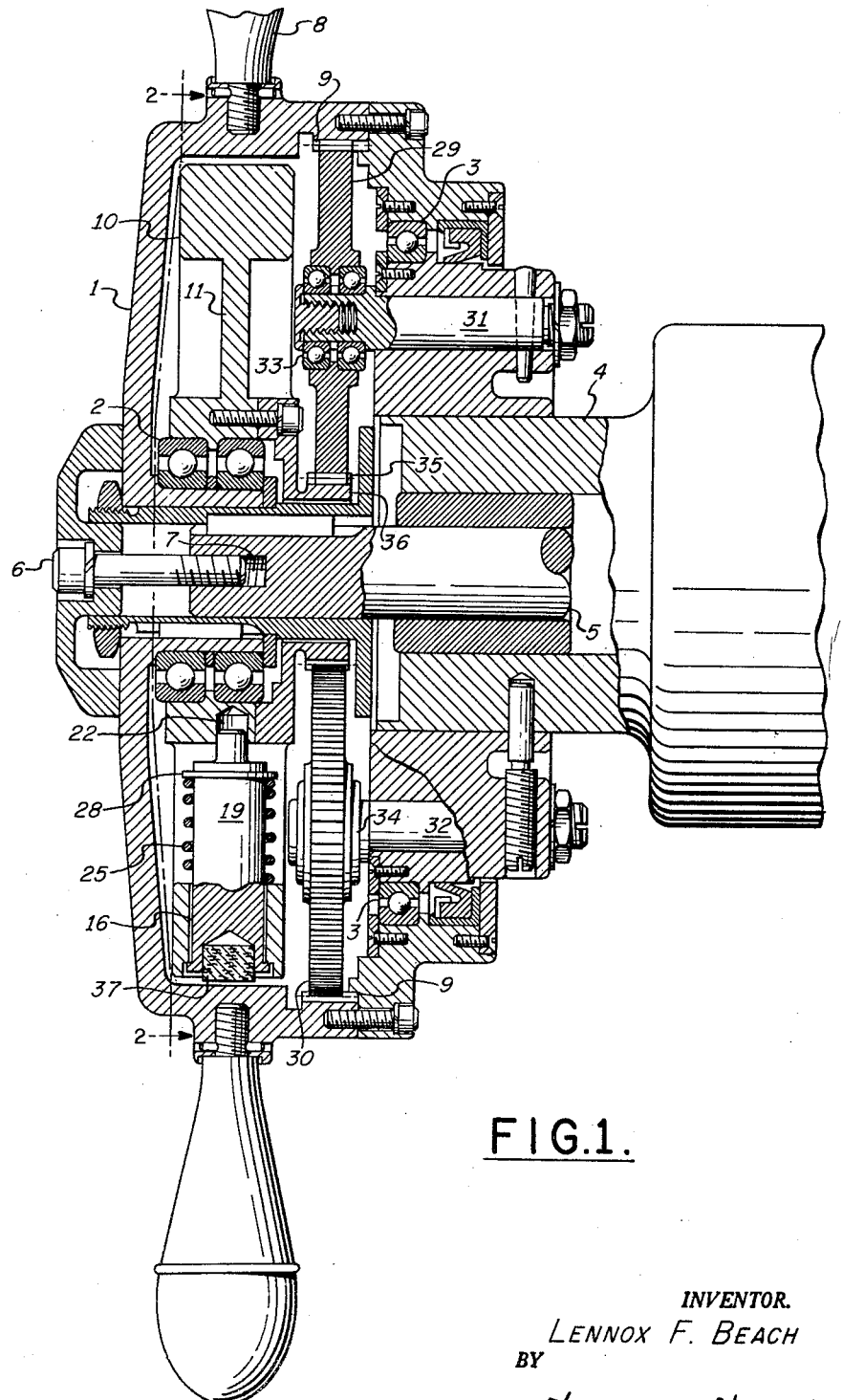

INVENTOR.
LENNOX F. BEACH
BY
ATTORNEY

United States Patent Office 3,067,847
Patented Dec. 11, 1962

3,067,847
SHAFT SPEED AND ACCELERATION
LIMITING DEVICE
Lennox F. Beach, Mill Neck, N.Y., assignor to Sperry
Rand Corporation, Great Neck, N.Y., a corporation of
Delaware
Filed July 13, 1961, Ser. No. 123,853
9 Claims. (Cl. 192—4)

The present invention generally relates to devices for limiting the angular velocity and acceleration of a rotatable shaft and, more particularly, to an all-mechanical device of such type characterized by compact and rugged construction.

There are many instances in which it becomes desirable to regulate or limit the maximum angular velocity and acceleration of a rotatable shaft. For example, the rotatable shaft might be an input command station for a follow-up servomechanism. Such servomechanisms, of course, have inherent limitations on their ability to follow accurately beyond certain maximum values of input shaft velocity and acceleration. In the familiar case of a steering wheel for controlling the position of a ship's rudder, there is the possibility that the ability of the follow-up steering mechanism to remain in step with the steering wheel command signals may be exceeded in the event that the helmsman imparts too great a velocity or acceleration to the steering wheel. When the helmsman exceeds the inherent velocity and acceleration limitations of the steering mechanism, the rudder will fail to follow the steering wheel and will fall out of the desired synchronous relationship therewith. One obvious solution to the problem is to provide a follow-up steering mechanism which is self synchronizing, or which has an increased response characteristic. Generally, this involves the use of a much less reliable, heavier, more expensive and complex servomechanism. Alternatively, the use of a heavier steering wheel having greater inertia with the introduction of viscous or mechanical friction to limit the velocity response of the steering wheel may be resorted to. Such solutions are undesirable because of the concomitant sacrifice of simplicity, economy and reliability.

It is the principal object of the present invention to provide an all-mechanical device characterized by simple, compact and rugged construction for limiting the angular motion of a shaft.

Another object is to provide a governing device adapted for mounting on a rotatable shaft whose velocity and acceleration are to be limited.

An additional object is to provide an improved steering wheel unit for limiting the maximum velocity and acceleration that a helmsman might impart thereto.

These and other objects of the present invention, as will appear from a reading of the following specification, are achieved in an illustrative embodiment by the provision of a steering wheel adapter unit designed for connection to a ship's steering wheel shaft. The adapter unit includes an outer hollow cylindrical member which is attached to the steering wheel shaft. A plurality of hand grips are mounted about the outer circumference of the outer member for use by the helmsman. An internal gear is cut into the inner circumference of the outer member.

A fly wheel is journalled for rotation coaxially within the outer member. The fly wheel is provided with a hub extending along its axis of rotation. An external gear is cut about the outer circumference of the extended hub. There is also provided an idler gear which is journalled about an axis parallel to the axis of the outer member. The idler gear meshes with the internal gear of the outer member and the gear on the extended hub of the fly wheel whereby the outer member is connected for rotation with the fly wheel by means of the idler gear.

A weighted brake shoe is slidably attached to the fly wheel and adapted to move radially outward of the fly wheel by centrifugal force into braking contact with the inner circumference of the outer cylindrical member. The brake shoe is restrained against contacting the outer member by a spring whose restraining effort is overcome only when the angular velocity of the fly wheel exceeds some predetermined value.

The step up ratio of the gearing between the outer cylindrical member and the fly wheel increases by the square of the gear ratio the force required of the helmsman to produce excessive fly wheel velocity as compared to the force that would be required if the fly wheel itself were directly turned by the helmsman. Additionally, the same gearing permits the use of a smaller and lighter fly wheel to impose a given reactive force on the helmsman should he attempt to exceed a predetermined acceleration. The reflected inertia of the geared fly wheel is increased by the square of the gear ratio as compared to the inertia of the fly wheel itself.

At low helm input velocities, the weighted brake shoes do not come into contact with the outer cylindrical member and the helmsman experiences no appricable resistance to his turning effort. Thus, the steering wheel adapter unit of the present invention turns freely under normal handling and avoids unnecessary fatiguing of the helmsman. Inasmuch as the braking force increases as the square of the angular velocity of the steering wheel in excess of a desired value, the force required to overspeed the steering wheel increases rapidly as the steering wheel velocity is increased. The result is that the helmsman is precluded from turning the steering wheel shaft with a velocity or acceleration beyond the tracking capability of the follow-up servomechanism.

Figure 2:
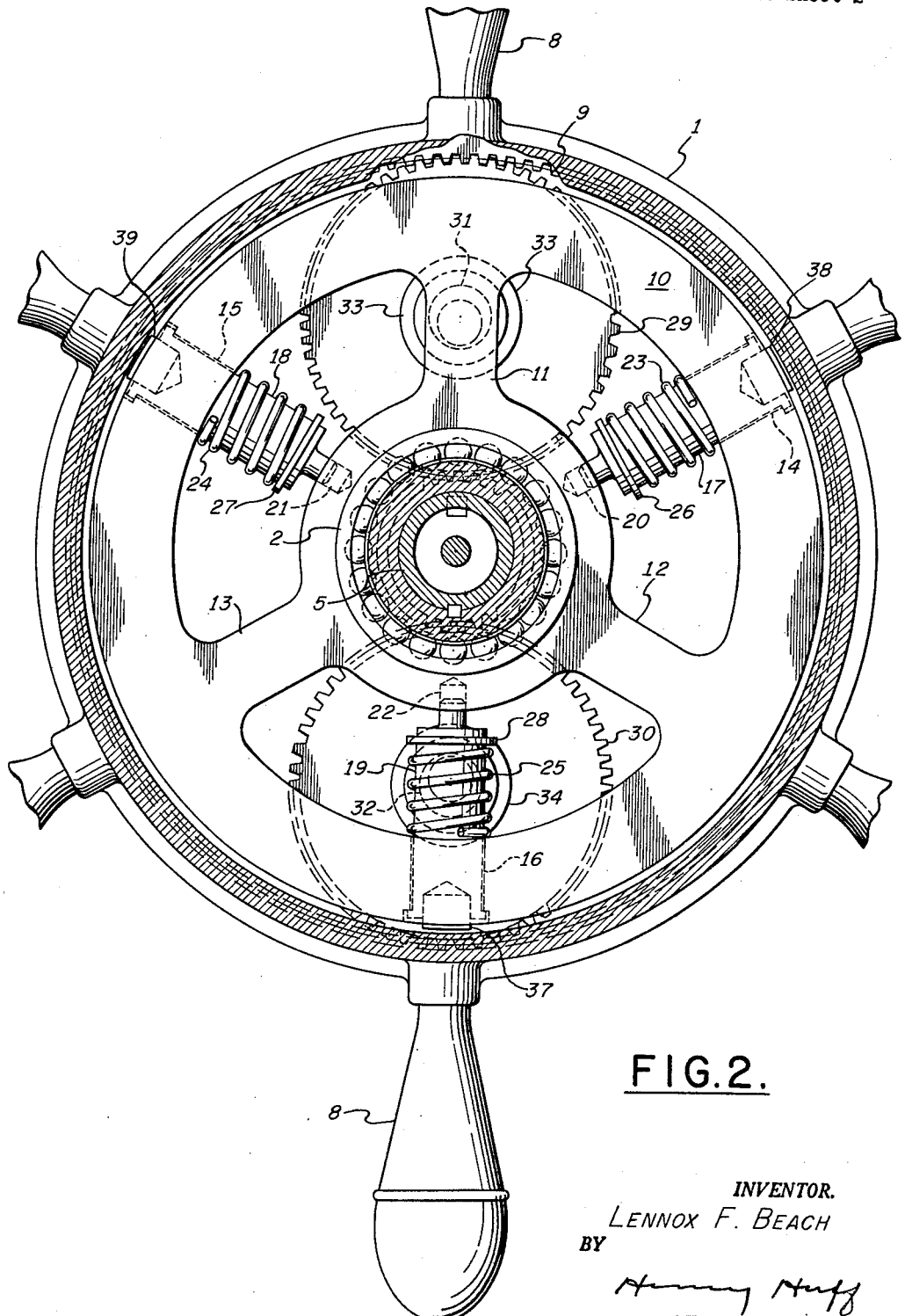

For a more complete understanding of the present invention, reference should be had to the following specification and the drawings of which:

FIG. 1 is a sectional view of a steering wheel adapter unit embodiment of the present invention taken along the axis of the steering wheel shaft; and FIG. 2 is an end-on view of the adapter unit of FIG. 1.

Referring to FIGS. 1 and 2, the steering wheel adapter unit comprises an outer hollow cylindrical member 1 which is journalled for rotation by bearing 3 for rotation about hollow steering wheel housing 4. Steering wheel shaft 5 is journalled for rotation within housing 4 and is affixed to cylindrical member 1 by means of screw 6 which engages a recessed and threaded portion 7 of shaft 5. A plurality of hand grips 8, for manipulation by the helmsman, are attached to predetermined points about the outer circumference of member 1. An internal ring gear 9 is cut into the inner circumference of the outer cylindrical member 1.

Fly wheel 10 is coaxially journalled by means of duplex bearings 2 within outer member 1 for rotation about shaft 5. Fly wheel 10 comprises a series of radially extensive ribs 11, 12 and 13 and is apertured along other portions 14, 15, 16, 20, 21 and 22 to slidably engage weighted brake shoe assemblies 17, 18 and 19. Brake shoe assemblies 17, 18 and 19 are arranged to move radially outward of the fly wheel by centrifugal force into contact with the inner circumference of outer member 1. The brake shoe assemblies are constrained against such radial movement by means of springs 23, 24 and 25. One end of springs 23, 24 and 25 is held by respective snap rings 26, 27 and 28 secured to the respective brake shoe assemblies 17, 18 and 19. The other end of each of the springs is held by the circumferential portion of fly wheel 10 surrounding the apertured regions 14, 15 and 16. Thus, the centrifugal force urging the brake assembly into contact with outer member 1 must act against the compressional force exerted by each of the springs 23, 24 and 25.

Idler gears 29 and 30 are mounted about fixed shafts 31 and 32. Shafts 31 and 32 are mounted about axes parallel to the axis of steering column 4. The idler gears are journalled for rotation about said fixed axes by means of respective ones of the duplex bearings 33 and 34. Idler gears 29 and 30 mesh with the internal ring gear 9 of outer member 1 and with gear 35 cut about the extended hub 36 of fly wheel 10.

It will be seen that a given rotation of the outer member 1 by the helmsman imparts a more rapid rotation to the fly wheel 10 through the step up gearing provided by gears 9, 29 and 35. As is well understood, the centrifugal force acting on weighted brake shoe assemblies 14, 15 and 16 is proportional to the square of the angular velocity of fly wheel 10. Once the centrifugal force has increased to a value overcoming the restraining effect of springs 23, 24 and 25, brake shoes 37, 38 and 39 are brought into contact with the inner circumference of outer member 1. Any further increase in the velocity of outer member 1 and, hence, of fly wheel 10, greatly increases the force pressing the brake shoes against outer member 1. Inasmuch as the ratio of the angular velocity of fly wheel 10 relative to the angular velocity of member 1 is equal to the step up gear ratio, it can be seen that the braking force is effectively increased by the square of the gear ratio. Thus, any attempt by the helmsman to exceed the desired maximum velocity of the steering shaft 5 is opposed by a rapidly increasing braking force. In this manner, it becomes physically impossible for the helmsman to impart a velocity to steering shaft 5 which is in excess of the ability of the servomechanism (not shown) to follow the movements of the steering wheel shaft.

It should be noted that at speeds below the desired angular velocity limit fly wheel 10 and outer member 1 spin easily and do not impose an unnecessary burden upon the helmsman. Normal velocity operation of the steering wheel is substantially unimpeded. The helmsman experiences opposition to this turning effort only when attempting to operate the wheel at abnormal velocities and accelerations (those which the follow-up servo-mechanism cannot accurately follow). In the latter case, the opposition increases substantially and rapidly.

One of the important features of the present invention is that although there is a square-law or parabolic relationship between the steering wheel velocities in excess of a predetermined value and the resultant reactionary force component experienced by the helmsman, there is a linear relationship between steering wheel acceleration and the reactionary force component attributable thereto. In other words, the steering wheel unit provides an angular velocity limit that is more closely defined than the angular acceleration limit. Experience has shown that velocity considerations generally are more critical than acceleration aspects. That is, the velocity limitation of a servomechanism ordinarily is established by the maximum rotational speed of the servomotor. Said maximum rotational speed cannot be surpassed irrespective of the angular velocity at which the input control shaft is driven. On the other hand, sufficient torque generally can be created by the servo motor in order to follow relatively high input shaft accelerations simply by providing sufficient amplification of the control signal before application to the servomotor. Thus, the velocity and acceleration characteristics of the shaft governing device of the present invention dovetail well with the inherent velocity and acceleration response capability of a widely used class of object positioning systems.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. A device for limiting the velocity and acceleration of a rotatable shaft, said device comprising a first member attached to said shaft and mounted for rotation about the axis of rotation of said shaft, a second member journalled for rotation about said axis of said shaft, a gear train drivably connecting said first and second members for rotation about said axis of said shaft, and a weighted member slidably attached to said second member and adapted to move radially outward of said second member by centrifugal force into braking contact with said first member.

2. A device for limiting the velocity and acceleration of a rotatable shaft, said device comprising an outer hollow cylindrical member attached to said shaft and mounted for rotation about the axis of rotation of said shaft, said outer member having an internal gear on the inner circumference thereof, a rotatable member journalled for rotation coaxially within said outer member, said rotatable member having a geared hub, an idler gear journalled for rotation about an axis parallel to said axis of said shaft, said idler gear meshing with said internal gear and with said geared hub whereby said outer member is connected for rotation with said rotatable member by means of said idler gear, and a weighted brake shoe assembly slidably attached to said rotatable member and adapted to move radially outward of the rotatable member by centrifugal force into braking contact with said inner circumference of said outer member.

3. A device for limiting the velocity and acceleration of a rotatable shaft, said device comprising an outer hollow cylindrical member attached to said shaft and mounted for rotation about the axis of rotation of said shaft, said outer member having an internal gear on the inner circumference thereof, a fly wheel journalled for rotation coaxially within said outer member, said fly wheel having a geared hub, an idler gear journalled for rotation about an axis parallel to said axis of said shaft, said idler gear meshing with said internal gear and with said geared hub whereby said outer member is connected for rotation with said fly wheel by means of said idler gear, and a weighted brake shoe assembly slidably attached to said fly wheel and adapted to move radially outward of the fly wheel by centrifugal force into braking contact with said inner circumference of said outer member.

4. A device for limiting the velocity and acceleration of a rotatable shaft, said device comprising an outer hollow cylindrical member attached to said shaft and mounted for rotation about the axis of rotation of said shaft, said outer member having an internal gear on the inner circumference thereof, a rotatable member journalled for rotation coaxially within said outer member, said rotatable member having a geared hub, an idler gear journalled for rotation about an axis parallel to said axis of said shaft, said idler gear meshing with said internal gear and with said geared hub whereby said outer member is connected for rotation with said rotatable member by means of said idler gear, a weighted brake shoe assembly slidably attached to said rotatable member and adapted to move radially outward of the rotatable member by centrifugal force into braking contact with said inner circumference of said outer member, and resilient means attached to said assembly for yieldably restraining said assembly from moving radially outward of said rotatable member.

5. A device for limiting the velocity and acceleration of a rotatable shaft, said device comprising an outer hollow cylindrical member attached to said shaft and mounted for rotation about the axis of rotation of said shaft, said outer member having an internal gear on the inner circumference thereof, a fly wheel journalled for rotation coaxially within said outer member, said fly wheel having a geared hub extending along said axis, an idler gear journalled for rotation about an axis parallel to said element, said idler gear meshing with said internal gear and with said geared hub whereby said outer member is connected for rotation with said fly wheel by means of said idler gear, a weighted brake shoe assembly slidably attached to said fly wheel and adapted to move radially outward of the fly wheel by centrifugal force into braking contact with said inner circumference of said outer member, and resilient means attached to said assembly for yieldably restraining said assembly from moving radially outward of said fly wheel.

6. A steering wheel unit comprising a rotatable shaft, an outer hollow cylindrical member attached to said shaft and mounted for rotation about the axis of rotation of said shaft, said outer member having an internal gear on the inner circumference thereof, a rotatable member journalled for rotation coaxially within said outer member, said rotatable member having a geared hub, an idler gear journalled for rotation about an axis parallel to said axis of said shaft, said idler gear meshing with said internal gear and with said geared hub whereby said outer member is connected for rotation with said rotatable member by means of said idler gear, and a weighted brake shoe assembly slidably attached to said rotatable member and adapted to move radially outward of the rotatable member by centrifugal force into braking contact with said inner circumference of said outer member.

7. A steering wheel unit comprising a rotatable shaft, an outer hollow cylindrical member attached to said shaft and mounted for rotation about the axis of rotation of said shaft, a plurality of hand grips mounted about the outer circumference of said outer member, said outer member having an internal gear on the inner circumference thereof, a fly wheel journalled for rotation coaxially within said outer member, said fly wheel having a geared hub, an idler gear journalled for rotation about an axis parallel to said axis of said shaft, said idler gear meshing with said internal gear and with said geared hub whereby said outer member is connected for rotation with said fly wheel by means of said idler gear, and a weighted brake shoe assembly slidably attached to said fly wheel and adapted to move radially of the fly wheel by centrifugal force into braking contact with said inner circumference of said outer member.

8. A steering wheel unit comprising a rotatable shaft, an outer hollow cylindrical member attached to said shaft and mounted for rotation about the axis of rotation of said shaft, a plurality of hand grips mounted about the outer circumference of said outer member, said outer member having an internal gear on the inner circumference thereof, a rotatable member journalled for rotation coaxially within said outer member, said rotatable member having a geared hub extending along said axis, an idler gear journalled for rotation about an axis parallel to said axis, said idler gear meshing with said internal gear and with said geared hub whereby said outer member is connected for rotation with said rotatable member by means of said idler gear, a weighted brake shoe assembly slidably attached to said rotatable member and adapted to move radially outward of the rotatable member by centrifugal force into braking contact with said inner circumference of said outer member, and resilient means attached to said assembly for yieldably restraining said assembly from moving radially outward of said rotatable member.

9. A steering wheel unit comprising a rotatable shaft, an outer hollow cylindrical member attached to said shaft and mounted for rotation about the axis of rotation of said shaft, a plurality of hand grips mounted about the outer circumference of said outer member, said outer member having an internal gear cut into the inner circumference thereof, a fly wheel journalled for rotation coaxially within said outer member, said fly wheel having a geared hub extending along said axis, an idler gear journalled for rotation about an axis parallel to said axis, said idler gear meshing with said internal gear and with said geared hub whereby said outer member is connected for rotation with said fly wheel by means of said idler gear, a weighted brake shoe assembly slidably attached to said fly wheel and adapted to move radially outward of the fly wheel by centrifugal force into braking contact with said inner circumference of said outer member, and a spring attached to said assembly for yieldably restraining said assembly from moving radially outward of said fly wheel.

References Cited in the file of this patent

UNITED STATES PATENTS

| | | |
|---|---|---|
| 1,899,999 | Uhlich et al. | Mar. 7, 1933 |
| 2,305,822 | Wittner | Dec. 22, 1942 |
| 2,573,387 | Bush | Oct. 30, 1951 |